No. 682,414. Patented Sept. 10, 1901.
L. LEHR.
DEVICE FOR FORMING FINGER RING MOLDS.
(Application filed May 10, 1901.)
(No Model.)
2 Sheets—Sheet 2.
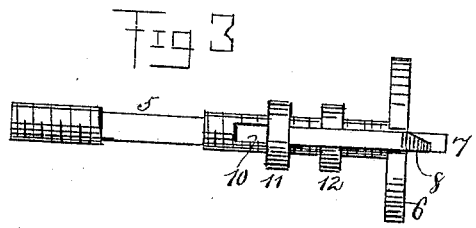
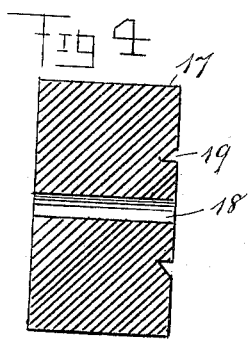
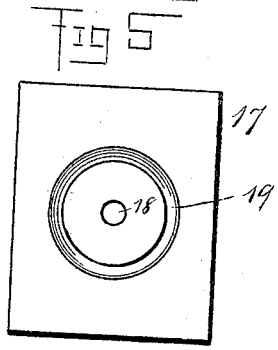
WITNESSES:
Louis Lehr
INVENTOR
BY
ATTORNEY

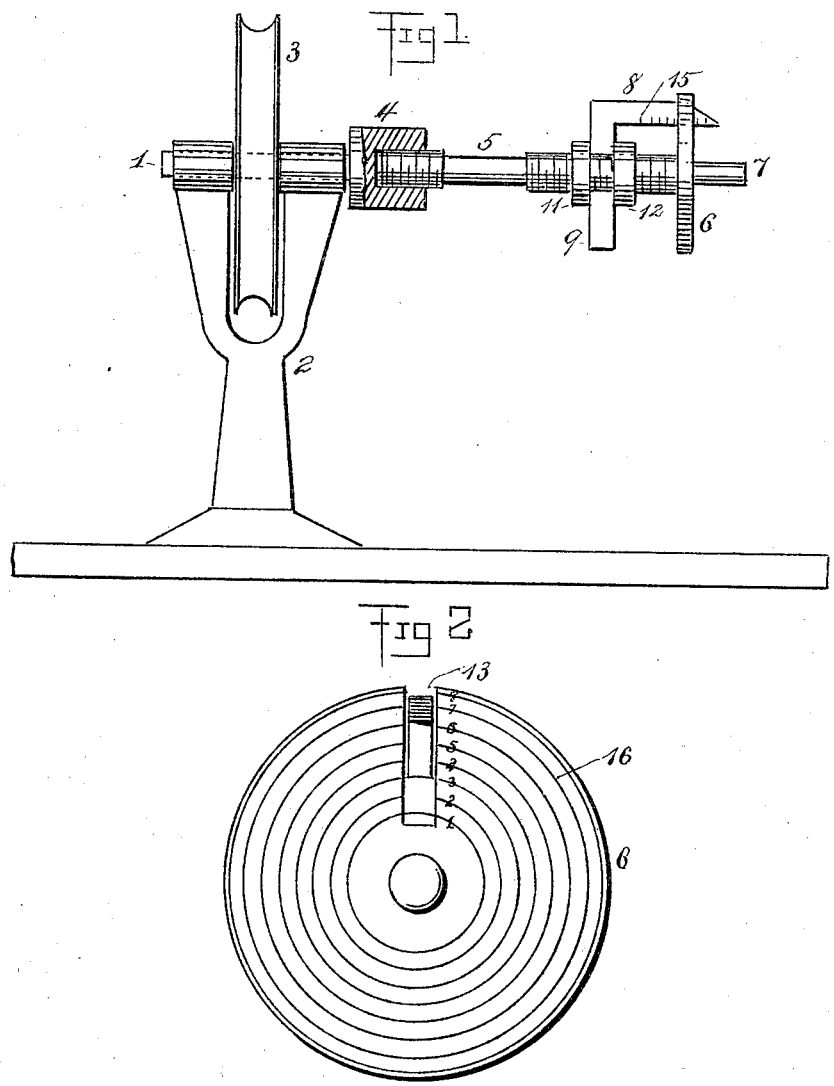

UNITED STATES PATENT OFFICE.

LOUIS LEHR, OF NEW YORK, N. Y.

DEVICE FOR FORMING FINGER-RING MOLDS.

SPECIFICATION forming part of Letters Patent No. 682,414, dated September 10, 1901.

Application filed May 10, 1901. Serial No. 59,568. (No model.)

*To all whom it may concern:*

Be it known that I, LOUIS LEHR, a citizen of the United States, residing at New York, borough of Manhattan, county of New York, and State of New York, have invented a new and useful Improvement in Devices for Making Finger-Ring Molds, of which the following is a full and complete description.

The object of the invention is to provide a simple machine for cutting the ring form in the two sections of a mold and so arranged that it may be quickly adjusted for different widths and sizes of finger-rings.

I will describe my machine in connection with the accompanying drawings and then set out the invention in the claims.

In the drawings, Figure 1 is a front elevation of the device. Fig. 2 is a face view, on an enlarged scale, of the gage-plate and cutting-tool. Fig. 3 is a plan view of the device. Fig. 4 is a sectional view of a mold-section as formed by the machine, and Fig. 5 is a face view thereof.

Referring to the drawings, 1 designates a shaft having bearings in a standard 2, designed to be mounted on a suitable table or other support, and attached to the shaft is a band-pulley 3, to which power may be applied from any desired source—such, for instance, as a foot-treadle.

On the shaft 1 is a head 4, having an interior screw-thread to engage an exterior screw-thread of a spindle 5, which has attached to its outer end a gage-plate 6, from the center of which a centering-point 7 extends. Adjusted longitudinally of the spindle and radially of the plate 6 is the cutting-tool 8. The cutting-tool has extended at right angles to it a shank 9, which passes through a longitudinal slot 10 in the spindle, and this slotted portion of the spindle is screw-threaded for receiving set-nuts 11 and 12, adapted to engage against opposite sides of the shank 9 to hold the cutting-tool as adjusted for the depth of cut through a slot 13 in the plate 6.

The cutter is provided with a scale 15, which will be properly numbered, so that it may be adjusted for the depth of cut, and the front of the plate 6 is provided with a scale consisting of concentric number-lines 16 for adjusting the cutting-tool to different sizes of molds in diameter. For cutting molds for transversely-rounded rings the outer edge of the cutting-tool is beveled; but when a mold for flat or band rings is to be formed the cutter will have parallel cutting edges.

In operation the block 17, in which the half-section of the form is to be cut, is first provided with a hole 18 to receive the centering-point 7. While the spindle is in rapid rotation the block is to be pressed toward the gage-plate and against the cutter, which will form the annular channel 19, forming one-half of the mold. After the two sections are formed the pouring-gate may be formed in any desired manner.

Having described my invention, what I claim is—

1. In a device for forming finger-ring molds a shaft, a head on the shaft having an interior thread, a spindle for engaging said thread, a gage-plate on the spindle and a cutting-tool adjusted on the spindle.

2. In a device for forming finger-ring molds, a longitudinally-slotted spindle, a cutting-tool, having a shank portion for passing through the slot, set-nuts on the spindle for engaging opposite sides of the shank, and a gage-plate on the spindle and having a slot to receive the cutting-tool.

3. In a device for forming finger-ring molds a spindle, a graduated gage-plate on the spindle, the said plate having an outwardly-opening slot and the graduated cutting-tool adjusted along the spindle and in said slot.

LOUIS LEHR.

Witnesses:
SAMUEL SUTTON,
CLEMIE MAYER.